(12) United States Patent
Winey et al.

(10) Patent No.: US 8,551,604 B2
(45) Date of Patent: Oct. 8, 2013

(54) FLOORING PRODUCT HAVING REGIONS OF DIFFERENT RECYCLE OR RENEWABLE CONTENT

(75) Inventors: Rebecca L. Winey, Lancaster, PA (US); Jeffrey S. Ross, Lancaster, PA (US); Fang Qiao, Lancaster, PA (US); Ronald S. Lenox, Lancaster, PA (US); Dong Tian, Lancaster, PA (US); Gary A. Sigel, Millersville, PA (US)

(73) Assignee: AWI Licensing Company, Wilmington, DE (US)

( * ) Notice: Subject to any disclaimer, the term of this patent is extended or adjusted under 35 U.S.C. 154(b) by 609 days.

(21) Appl. No.: 11/541,593

(22) Filed: Oct. 2, 2006

(65) Prior Publication Data

US 2008/0081158 A1 Apr. 3, 2008

(51) Int. Cl.
*B32B 3/00* (2006.01)
(52) U.S. Cl.
USPC ............................................. 428/195.1
(58) Field of Classification Search
USPC ............................................. 428/195.1
See application file for complete search history.

(56) References Cited

U.S. PATENT DOCUMENTS

| | | | | |
|---|---|---|---|---|
| 2,268,759 A * | 1/1942 | Martin | | 264/120 |
| 4,020,020 A | 4/1977 | Appleyard et al. | | 521/40 |
| 4,105,593 A | 8/1978 | Stavrinou | | 521/465 |
| 4,122,224 A | 10/1978 | Brewer et al. | | 428/159 |
| 5,350,550 A * | 9/1994 | Kitazawa et al. | | 264/45.1 |
| 5,985,964 A | 11/1999 | Herbst | | 524/114 |
| 6,664,972 B2 | 12/2003 | Eichel et al. | | 345/582 |
| 6,770,328 B1 | 8/2004 | Whaley | | 427/407.1 |
| 6,998,170 B2 | 2/2006 | Balmer et al. | | 428/221 |
| 2003/0044561 A1 | 3/2003 | Kobayashi et al. | | 428/47 |
| 2003/0216496 A1 * | 11/2003 | Mohanty et al. | | 524/284 |
| 2004/0185296 A1 * | 9/2004 | Mazzanti | | 428/688 |
| 2004/0192859 A1 * | 9/2004 | Parker et al. | | 525/438 |
| 2004/0197515 A1 * | 10/2004 | Shultz et al. | | 428/44 |
| 2005/0064117 A1 * | 3/2005 | Lehman | | 428/34.4 |
| 2005/0266234 A1 | 12/2005 | Muller et al. | | 428/333 |

OTHER PUBLICATIONS

Armstrong World Industries Flooring Products, Documents Obtained from www.archive.org published on Jun. 23, 2005 or earlier: http://web.archive.org/web/20050623083547/www.armstrong.com/commflooringna/.*
Standard Specification for Vinyl Composition Floor Tile(1), ASTM International, Designation: F 1066-04, Published Sep. 2004, pp. 770-774.

* cited by examiner

*Primary Examiner* — David Sample
*Assistant Examiner* — Tahseen N Khan

(57) ABSTRACT

A flooring product comprises a heterogeneous design layer having multiple regions wherein two regions comprise compositions having different recycle content or renewable content. The thickness of the design layer may be greater than the dimensions of the regions or the regions may extending from the top surface of the layer to the bottom surface of the design layer. The heterogeneous layer may be composed of consolidated particles/chips which may contain a polyester binder system with a renewable component. Additionally, a method for making a heterogeneous layer having a target wt % recycle content or renewable content is also disclosed.

25 Claims, 5 Drawing Sheets

FLOORING PRODUCT HAVING REGIONS OF DIFFERENT RECYCLE OR RENEWABLE CONTENT

FIELD OF THE INVENTION

The present invention relates generally to the field of flooring products and more particularly to flooring products having a heterogeneous layer with multiple regions having different recycle or renewable content. The heterogeneous layer may be composed of consolidated particles or chips. Additionally, the invention relates to a method for making a heterogeneous layer having a target recycle content.

BACKGROUND OF THE INVENTION

Vinyl flooring products comprising a heterogeneous layer of consolidated particles or chips are well known and are extensively utilized in commercial sheet or tile flooring applications. In some products, the particles or chips extend from the top surface of the design layer to the bottom surface of the design layer to form a through color/pattern layer. In other products, the thickness of the design layer is greater than the dimensions of the particles or chips, so that the random color design may change as the design layer is worn away.

One particular well known example is vinyl composition tile (VCT), as described by ASTM Specification 1066-04. VCT is a vinyl product made mostly of limestone but contains plasticizers and other bonding agents.

While the present invention is intended for use in a similar type tile, as the specification and Examples describe, it will be obvious to one skilled in the art that the invention is also applicable to various other similar types of flooring, including tile products such as Type III solid vinyl tile and surface applied tile, and to sheet flooring products formed from consolidated chips or fused particles.

The use of recycle or scrap vinyl binder resins in vinyl flooring is known as described in U.S. Pat. Nos. 4,020,020, 4,105,593 and 4,122,224. Additionally, scrap vinyl and other scrap or recycle materials have also been used to prepare a backing layer for use in floor tile and sheet products. In these cases, opaque layers are placed over the scrap backing layer to hide the backing color, and decorative layers or designs are placed above the opaque layer to provide the desired final product visual.

Recently, the US Green Building Council has established the LEED (Leadership in Energy and Environmental Design) system for scoring points for new commercial construction (Table 1). Under the LEED system, flooring can be used to obtain points in new construction if it contains 10% by weight or more of post-industrial recycle material or 5% by weight or more of post-consumer recycle material or a combination of post-industrial and post-consumer. In a similar manner, for existing buildings flooring can be used to obtain points if it contains 20% by weight or more of post-industrial recycle material or 10% by weight or more of post-consumer recycle material.

TABLE 1

| LEED System For New Commercial Construction | | | |
|---|---|---|---|
| Rating System | LEED-NC Version 2.1 | Rating System | LEED-EB Version 2.0 |
| MR Credit 4.1 1 Point | 5% wt = (post-consumer + ½ post-industrial) | MR Credit 2.1 1 Point | 10% (Post-Consumer materials), or |
| MR Credit 4.2 1 Point | 10% wt = (post-consumer + ½ post-industrial) | | 20% (Post-Industrial materials) |
| MR Credit 6 1 Point | 5% wt = (rapidly renewable building materials and products) | MR Credit 2.5 1 Point | 50% (Rapidly renewable materials) |

NC: New Construction;
EB: Existing Building;
Minimum % wt for each point. The % for both NC and EB is weight percent.
For NC 1 point is granted for at least 5% wt of the total of post-consumer and ½ post-industrial. A second point is granted for at least 10% wt of the total of post-consumer and ½ post-industrial. An additional point is granted for at least 5% wt of rapidly renewable building materials and products.
For EB 1 point is granted for at least 10% wt post-consumer materials. A second point is granted for at least 20% wt of post-industrial materials. An additional point is granted for at least 50% wt of rapidly renewable materials.

There has been renewed market interest in giving preference to "greener" flooring products based upon this LEED System. There remains a need to develop "greener" flooring products based upon existing product structures/processes, and available recycle or renewable materials.

SUMMARY OF THE INVENTION

The present invention provides a flooring product comprising a heterogeneous layer having multiple regions, wherein at least two regions comprise compositions having different recycle or renewable content. In some embodiments, the regions extend from the top surface of the layer to the bottom surface of the layer. In one embodiment, the heterogeneous layer comprises the entire flooring product structure. In another embodiment, the heterogeneous layer comprises a layer or portion of the flooring product. In one embodiment, the flooring product is a resilient flooring product.

In another embodiment, the flooring product comprises a heterogeneous layer that has at least 5% recycle or renewable materials, or qualifies for at least one point in the LEED system.

The heterogeneous layer comprises at least two regions with different recycle or renewable content. In one embodiment, the two regions comprise different concentrations of recycle or renewable material. In another embodiment, the two regions comprise different chemical compositions of recycle or renewable material. In another embodiment, the two regions have different colors. In yet another embodiment, one of the two regions with the darkest color has a higher recycle or renewable content than the other lighter colored region.

The heterogeneous layer can be composed of consolidated chips or particles comprising polymeric binder. In some embodiments, the polymeric binder comprises high molecular weight polyester resin. By using a polyester binder, the binder may also comprise renewable or recycle components.

In one embodiment a VCT type tile is provided comprising consolidated chips or particles, wherein the chips or particles comprise at least two compositions having different recycle content, and wherein the total recycle content of the VCT type tile is at least 10% by weight.

In another embodiment a VCT type tile is provided comprising consolidated chips or particles, wherein the chips or particles comprise at least two compositions having different recycle or renewable content, and wherein the VCT type tile qualifies for at least one point under the LEED System A process for formulating the heterogeneous layer to meet a target recycle or renewable content is also provided.

DETAILED DESCRIPTION OF THE INVENTION

Figure 1:
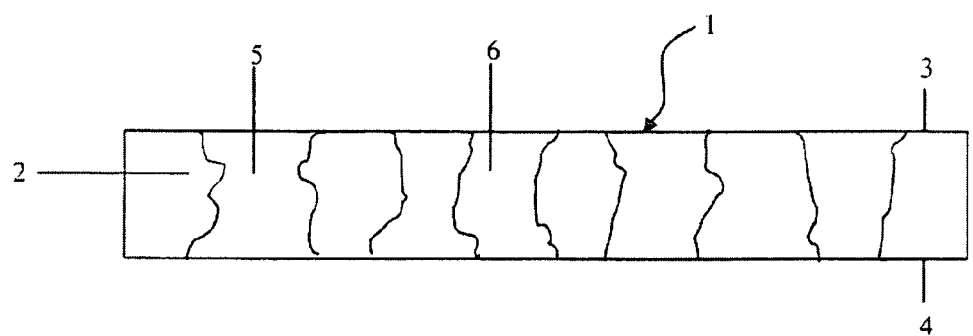
FIG. 1 is a cross-sectional view of a through color/pattern flooring product comprising the heterogeneous layer of the invention.

This invention describes a flooring product comprising a heterogeneous layer 1 (FIG. 1) having multiple regions 2 extending from the top surface 3 of the layer to the bottom surface 4 of the layer 1, wherein at least two regions 5 and 6 comprise compositions having different recycle content. The layer 1 is a solid, consolidated or fused polymeric layer composed of multiple regions and in some embodiments is formed from consolidated chips or particles. Such layers are known in the art as "through color" or "through pattern."

Figure 4:
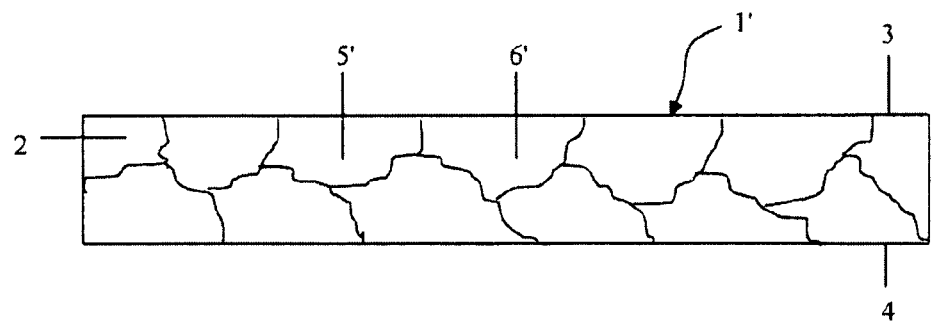
FIG. 4 is a cross-sectional view of a non-through color/pattern flooring product comprising the heterogeneous layer of the invention.

The flooring product shown in FIG. 4 is similar to the flooring product shown in FIG. 1 except the consolidated chips or particles forming regions 5' and 6' have a maximum dimension less than the thickness of the heterogeneous layer 1'. Therefore, the layer 1' is not a through color design layer and the pattern will change more dramatically than the pattern in FIG. 1 as the layer 1' is worn away.

Figure 2:
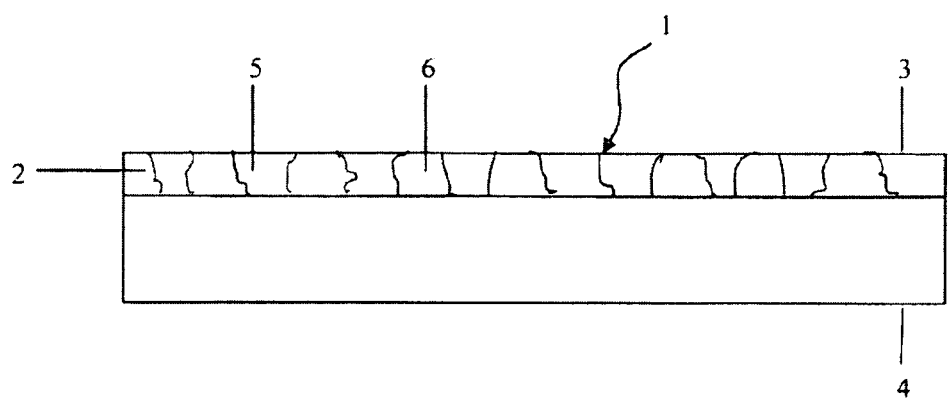
FIG. 2 a cross-sectional view of a surface applied floor tile containing the heterogeneous layer of the invention.
Figure 3:
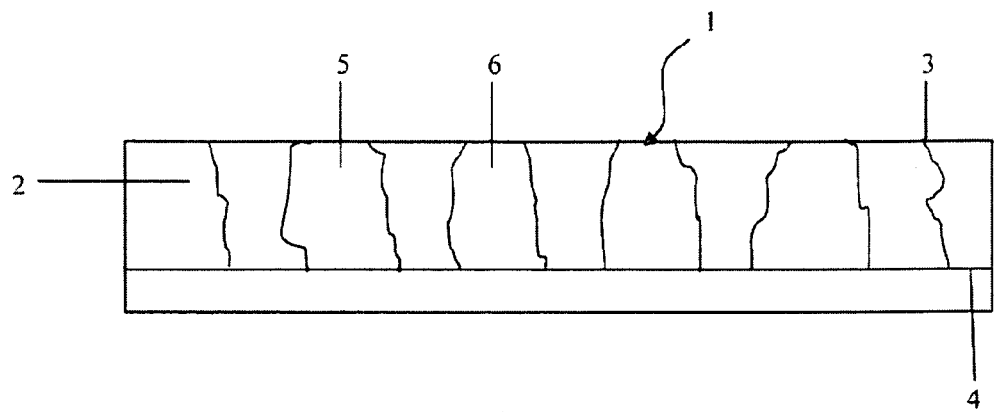
FIG. 3 is a cross-sectional view of a commercial sheet floor comprising the heterogeneous layer on a felt backing.

The layer 1 or 1' constitutes at least a portion of the flooring product visual or design layer. The layer 1 or 1' can comprise the entire flooring product, such as a VCT type tile, or it can comprise a portion of the flooring product, such as a surface applied tile (FIG. 2) or a commercial sheet product (FIG. 3). The layer 1 or 1' usually has a thickness that ranges from about 10 mils to about 250 mils. In one embodiment, the multiple regions comprise at least two regions 5 and 6 or 5' and 6' having different colors. In one embodiment, layer 1 or 1', when taken as a whole, comprises at least 5 weight % of recycle or renewable material, or meets at least one of the point categories defined by LEED-NC or LEED-EB standards.

The multiple regions 2 comprise individual regions that may include a polyester binder having a renewable content; post-consumer or post-industrial recycle; or renewable material. In one embodiment, the multiple regions 5 and 6 or 5' and 6' contain different recycle or renewable content. Different recycle content includes different amounts of recycle content and/or different recycle material compositions. In another embodiment the regions 5 and 6 or 5' and 6' are different in color as well as having different recycle or renewable content. In another embodiment, one of the two regions has a higher recycle or renewable content and a darker color than the other of the two regions.

The polymeric binder forming the particles or chips may comprise those polymeric materials that are useful in manufacturing flooring products. These binders include PVC homopolymers, various PVC copolymers, acrylic polymers, polyolefins, polylactic acid polymers, and various polymer blends that have been described in the literature. In one embodiment, the polymeric binder of layer 1 or 1' comprises high molecular weight polyester resin which was found useful in flooring products. Some of these new polyester binders comprise renewable content.

The high molecular weight polyester may also be blended with homo-polymer PVC to provide a flooring binder that contains no low molecular weight plasticizer or PVC copolymer resin. Additionally, these high molecular weight polyester resins can function as a flooring binder without the need for PVC, thereby not only avoiding the issues related to the use of plasticizers but also those related to the use of PVC.

The thermoplastic, high molecular weight polyester resin has a number average molecular weight (Mn) greater than 5000, and in some embodiments the polyester resins have a molecular weight (Mn) of at least 10,000. The polyesters may be biodegradable and/or may contain renewable components. In one embodiment, the polyester comprises at least 50% by weight of renewable components. In another embodiment, the polyester comprises at least 80% by weight of renewable components. In yet another embodiment, the polyester may comprise greater than 98% by weight of renewable and recycle components.

In one embodiment, the polyesters may comprise aliphatic diacid and aliphatic diol components. Although a wide range of aliphatic diacids and aliphatic diols may be used, it is preferred that these components come from renewable sources. Renewable aliphatic diacid and aliphatic diol components may include, but are not limited to, Bio-PDO (1,3-propanediol), 1,4-butanediol, sebacic acid, succinic acid, azelaic acid, glycerin and citric acid.

To further increase the renewable content and to improve other properties, these materials may also be modified by reaction with epoxidized soybean, epoxidized linseed oil, or other natural oils. The polyesters may be pre-reacted with epoxidized natural oils, or the reaction can by a dynamic vulcanization. Dynamic vulcanization is the process of intimate melt mixing of a thermoplastic polymer and a suitable reactive rubbery polymer to generate a thermoplastic elastomer. These reactions are particularly of interest for acid terminated polyesters. Other diacid and diol components from renewable resources will become available as the need for renewable materials continues to grow.

The diol components may also include diols which are branched or hindered to limit crystallinity in the final polyester binder. These branched diols include neopentyl glycol and glycerin.

Renewable components based on plants, animals or biomass processes have a different radioactive $C^{14}$ signature than those produced from petroleum. These renewable, biobased materials have carbon that comes from contemporary (non-fossil) biological sources. A more detailed description of biobased materials is described in a paper by Ramani Narayan, "Biobased & Biodegradable Polymer Materials: Rationale, Drivers, and Technology Exemplars," presented at American Chemical Society Symposium, San Diego 2005; American Chemical Society Publication #939, June 2006.

The Biobased Content is defined as the amount of biobased carbon in the material or product as fraction weight (mass) or percent weight (mass) of the total organic carbon in the material or product. ASTM D6866 (2005) describes a test method for determining Biobased content. Theoretical Biobased Content was calculated for the resultant polyester resins in Table 2 and Table 3.

In another embodiment, the thermoplastic, high molecular weight polyesters can comprise aromatic diacid components and aliphatic diol components. The aromatic acid components may include but are not limited to phthalic acid or anhydride, isophthalic acid, terephthalic acid or mixtures thereof. In some cases an amount of trimellitic anhydride can also be used. The aromatic structure increases stiffness and strength.

In another embodiment, the thermoplastic, high molecular weight polyesters may comprise aliphatic diacid and aromatic diacid components reacted with various aliphatic diols.

The thermoplastic, high molecular weight polyesters may also be branched. For example utilizing aliphatic alcohols that have more than two functional groups, such as glycerin, or aromatic acids having more than two functional groups such as trimellitic anhydride may be used to produce branched polyesters.

Although, the above diacid components are described, it is understood that their simple diesters such as from methanol or ethanol can be used to prepare the thermoplastic, high molecular weight polyesters via known transesterification techniques.

Depending upon the diacid and diol selected, polyesters can be amorphous or crystalline/semi-crystalline materials. In one embodiment, the polyester is amorphous. Table 2 shows some examples of amorphous polyester binders of the invention and their weight % renewable components.

TABLE 2

Compositions of Amorphous Polyesters With Renewable Content

| Trade Name | EX-1 Amt (g) | EX-2 Amt (g) | EX-3 Amt (g) | EX-4 Amt (g) | EX-5 Amt (g) | EX-6 Amt (g) |
| --- | --- | --- | --- | --- | --- | --- |
| 1,3-Propanediol | 367.60 | 380.88 | 381.80 | 372.21 | 370.19 | 357.64 |
| Isophthalic acid | 545.99 | 232.94 | 233.50 | 292.68 | 291.08 | 218.72 |
| Phthalic anhydride | 85.90 | 385.69 | 208.18 | 260.94 | 259.52 | 195.01 |
| Adipic acid | 0 | 0 | 176.03 | 0 | 0 | 0 |
| Azelaic acid | 0 | 0 | 0 | 73.66 | 0 | 0 |
| Sebacic acid | 0 | 0 | 0 | 0 | 78.71 | 228.13 |
| Dibutytin bis-lauryl mercaptide | 0.50 | 0.50 | 0.50 | 0.50 | 0.50 | 0.50 |
| Biobased Content wt % | 27 | 27 | 47 | 34 | 36 | 53 |
| Wt % Renewable Content of starting material | 37 | 38 | 56 | 45 | 45 | 59 |
| Tg Differential Scanning Calorimetry (DSC) | 25° C. | 3° C. | −22° C. | −9° C. | −10° C. | 29° C. |

In another embodiment, the polyester is crystalline and comprises a Tg below about 25° C. and a crystalline melting temperature Tm greater than 25° C. In yet another embodiment, the polyester has a Tg at or below about 25° C. and a Tm between about 25° C. and about 200° C. In some embodiments, flooring formulations comprising these crystalline polyesters or amorphous polyesters or a blend of crystalline and/or amorphous polyesters can be melt mixed using low intensity mixers employed in the manufacture of VCT Tile based upon PVC resin.

Table 3 shows some examples of crystalline polyesters having a Tg at or below about 25° C. and Tm above about 25° C. Tg and Tm were determined by standard Differential Scanning Calorimetry (DSC) techniques. The polyester compositions include modifying 100% renewable aliphatic polyesters by the addition of an amount of aromatic diacid, such as terephthalic acid, to help control crystalline regions and Tm.

TABLE 3

Compositions of Crystalline Polyesters With Renewable Content

| Ingredient | EX-7 Amt (g) | EX-8 Amt (g) | EX-9 Amt (g) | EX-10 Amt (g) | EX-11 Amt (g) | EX-12 Amt (g) | EX-13 Amt (g) |
| --- | --- | --- | --- | --- | --- | --- | --- |
| Glycerin | 25 | | | | | 24 | |
| Phthalic anhydride | | | 62 | 67 | 387 | | |
| 1,3-Propanediol | 510 | 238 | 138 | 258 | 241 | 228 | 334 |
| Trimellitic anhydride | | | | | 122 | | |
| Sebacic acid | 1130 | 281 | | | | 538 | |
| Isophthalic acid | | | | | | | 765 |

TABLE 3-continued

Compositions of Crystalline Polyesters With Renewable Content

| Ingredient | EX-7 Amt (g) | EX-8 Amt (g) | EX-9 Amt (g) | EX-10 Amt (g) | EX-11 Amt (g) | EX-12 Amt (g) | EX-13 Amt (g) |
|---|---|---|---|---|---|---|---|
| Terephthalic acid | 232 | 231 | 394 | 425 | | 110 | |
| 1,6-Hexanediol | | | 156 | | | | |
| T-20 Catalyst | 3.8 | 1.8 | 1.5 | 1.5 | 1.5 | 1.8 | 0.5 |
| Tg ° C. | −21 | −35 | 7 | 25 | 22 | −41 | 2 |
| Tm ° C. | 122 | 125 | 135 | 197 | 77 | 40 | 141 |
| Wt % Renewable Content of starting material | 88 | 69 | 18 | 34 | 32 | 85 | 33 |
| Biobased Content wt % | 85 | 67 | 13 | 27 | 26 | 87 | 27 |

These polyesters may be biodegradable and may comprise renewable components. Optionally, the binder system may also comprise up to about 30% by weight acid functionalized polymer such as EAA, EMA, Surlyn, or other (methacrylic) acrylic acid, or maleic acid (anhydride) copolymers for tile and up to about 50% weight acid functionalized polymer for sheet to obtain desired process and physical properties.

The high molecular weight polyesters may be prepared by several known methods. One method involves esterification of diacid and diol components at elevated temperature. Typically, an excess of diol is employed (see Example 6, Procedure 1A). After the acid functional groups have essentially reacted, a high vacuum is applied and excess diol is stripped off during continued transesterification, thereby increasing molecular weight. In some embodiments, 1,3-PDO is the diol of choice to build high molecular weight in this step of the process.

It has also been found that high molecular weight polyester resin can be made by esterification of a diacid and diol at elevated temperature using a very slight excess of diacid (See Example 6, Procedure 1B). After all the hydroxyl groups are reacted, a vacuum is applied to build molecular weight. The mechanism by which high molecular weight is achieved is not clear. Table 4 shows some examples of polyesters comprising renewable components and the number average molecular weights obtained from the processes of Example 6. Molecular weight was determined by GPC (gel permeation chromatography) technique.

prising renewable ingredients is first prepared. The recycle polyester resin is then mixed with the aliphatic polyester and transesterification between the two polyesters is accomplished at high temperature and under high vacuum. In one embodiment, the co-reacted polyesters had a Tm below about 150° C. It is understood that virgin PET, PBT, PPT or other polyesters may be employed in these type co-reactions.

Recycle materials can include those that function as fillers in the composition with the polymeric binder. Such filler materials include those obtained from wood or plants. These include pecan shells, wood flour, saw dust, walnut shells, rice hulls, corn cob grit, and others. Additionally, ground shells from animals such as clams and coral are renewable inorganic fillers. Such renewable fillers contain biobased carbon in the form of carbonates. These can be considered post-industrial or renewable materials.

Mineral fillers generated from post-industrial processes include limestone, quartz, ceramic powders, glass, fly ash, and concrete powder. Other fillers include recycle materials, such as recycle limestone, and natural materials, such as sand or ground coral or shells.

Additionally, recycle thermoplastic resin-based materials may be employed as fillers if they are incompatible with the polymeric binder. For example, PET, PBT, polyethylene (PE), polypropylene, polystyrene, polycarbonate, acrylonitrile butadiene styrene, Nylon and thermoplastic rubbers are essentially incompatible with PVC. Such materials, if added as particulate will essentially function as fillers in PVC com-

TABLE 4

High Molecular Weight Polyester Compositions Having Renewable Content

| Ingredient | EX-14 Amt (g) | EX-17 Amt (g) | EX-12 Amt (g) | EX-15 Amt (g) | EX-16 Amt (g) | EX-17 Amt (g) | EX-18 Amt (g) |
|---|---|---|---|---|---|---|---|
| Glycerin | | 25 | 24 | | 1.53 | 1.53 | |
| Phthalic anhydride | 159 | | | 133 | 4 | | 91 |
| 1,3-Propanediol | 212 | 510 | 228 | 199 | 38 | 44 | 310 |
| Sebacic acid | 84 | 1130 | 538 | 155 | 40 | 51 | 87 |
| Isophthalic acid | 416 | | | 347 | | | 508 |
| Terephthalic acid | | 232 | 110 | | 50 | 42 | |
| Neopentyl glycol | 124 | | | | 2 | | |
| Cyclohexane dimethanol | | | | 161 | | | |
| 1,6-Hexanediol | | | | | 9 | | |
| T-20 Catalyst | 5 | 3.8 | 1.8 | 5 | 0.4 | 0.4 | 5 |
| Molecular Weight (Mn) | 16,900 | 15,900 | 10,400 | 8,000 | 8,490 | 7,530 | 7,000 |

Another method for obtaining high molecular weight polyesters involves the co-reaction of a renewable polyester with recycle polyesters such as polyethylene terephthalate (PET), polybutylene terephthalate (PBT), polyproylene terephthalate (PPT) or other recycle polyester resins. In these co-reactions an aliphatic, high molecular weight polyester compositions. If the recycle thermoplastic resin is compatible with the binder, it may function as a binder and not as a filler in the composition. For example, recycle PVC particles incorporated into a PVC composition can function as a binder if melt processed. Depending upon the source, these materials can be post-industrial or post-consumer.

Recycle thermoset resin-based fillers can also be employed. For example, powders produced by grinding thermoset polyester materials, such as products made from bulk molding compounds or sheet molding compounds can be post-industrial, as well as post-consumer materials. Another thermoset material of interest is recycle fillers made from urea formaldehyde thermoset resins. Depending upon the source, these materials can also be post-industrial or post-consumer. Another example includes ground, cured (cross-linked) rubber materials such as used in tires. These rubber materials can be based on natural or synthetic rubbers, polyurethanes, or other well known thermoset rubber compositions.

There are several issues in utilizing recycle materials in flooring products. These issues include the size of available recycle particle, the color of the recycle particles which may interfere if the desired colors of the flooring product and in some cases limited volume of available sources. This is particularly true for post-consumer materials. For example, Table 5 shows potential availability and colors of several recycle filler materials from several major suppliers.

TABLE 5

| Urea/ Formaldehyde Powder | Fly Ash Powder | Ceramic Powder | Thermoset Polyester Powder | Rubber |
|---|---|---|---|---|
| 40K-160K lbs/month | 16.6 MM lb/month | 10K lb/month | 15K lb/month | Infinite |
| Light/variable color | Dark | Light Yellow | Light mixed colors | Dark |
| | | Infinite Volume Dark Colored Bricks | | |
| Post-Consumer | Post-Industrial | Post-Consumer & Post-Industrial | Post-Consumer | Post-Consumer & Post-Industrial |

To manufacture flooring products, large volumes of filler are required. In the case of VCT and other commercial flooring products, the product visuals have regions that range from white to black color, and usually each product visual comprises more than two regions of different color. When making flooring products to meet the 10% recycle content or other LEED standards, the use of different recycle materials in different regions provides a method for solving sourcing problems of small volume recycle materials. For example, darker colored regions can contain high loadings of fly ash powder, while lighter regions can contain appropriate loadings of urea formaldehyde (UF) powder.

Additionally, the darker regions composed of high fly ash content can be used with lighter colored regions containing standard, non-recycle calcium carbonate filler to meet the requirements of total recycle content. Therefore, the total recycle content of a VCT product would be based on the weight fraction of each colored region and its weight percent of recycle or renewable content.

Figure 5:
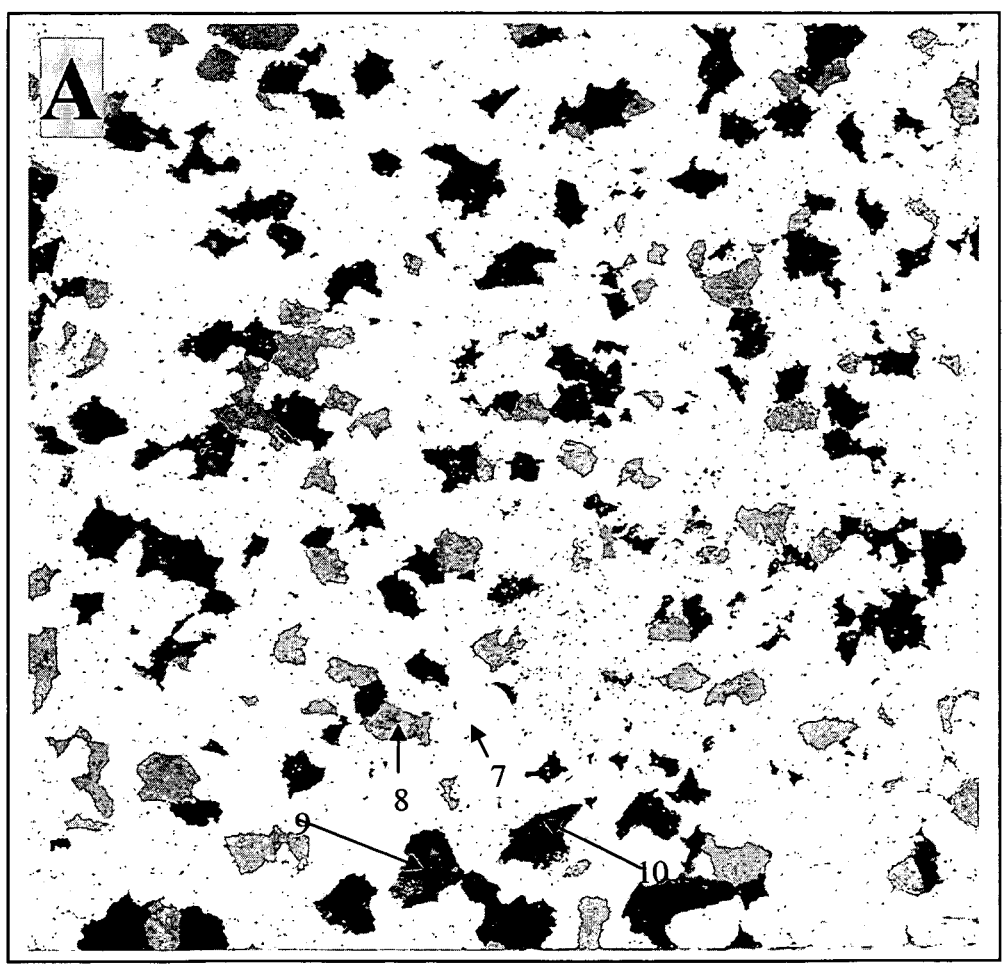
FIG. 5 is a top view of the heterogeneous layer 1 prepared according to Example 2.
Figure 6:
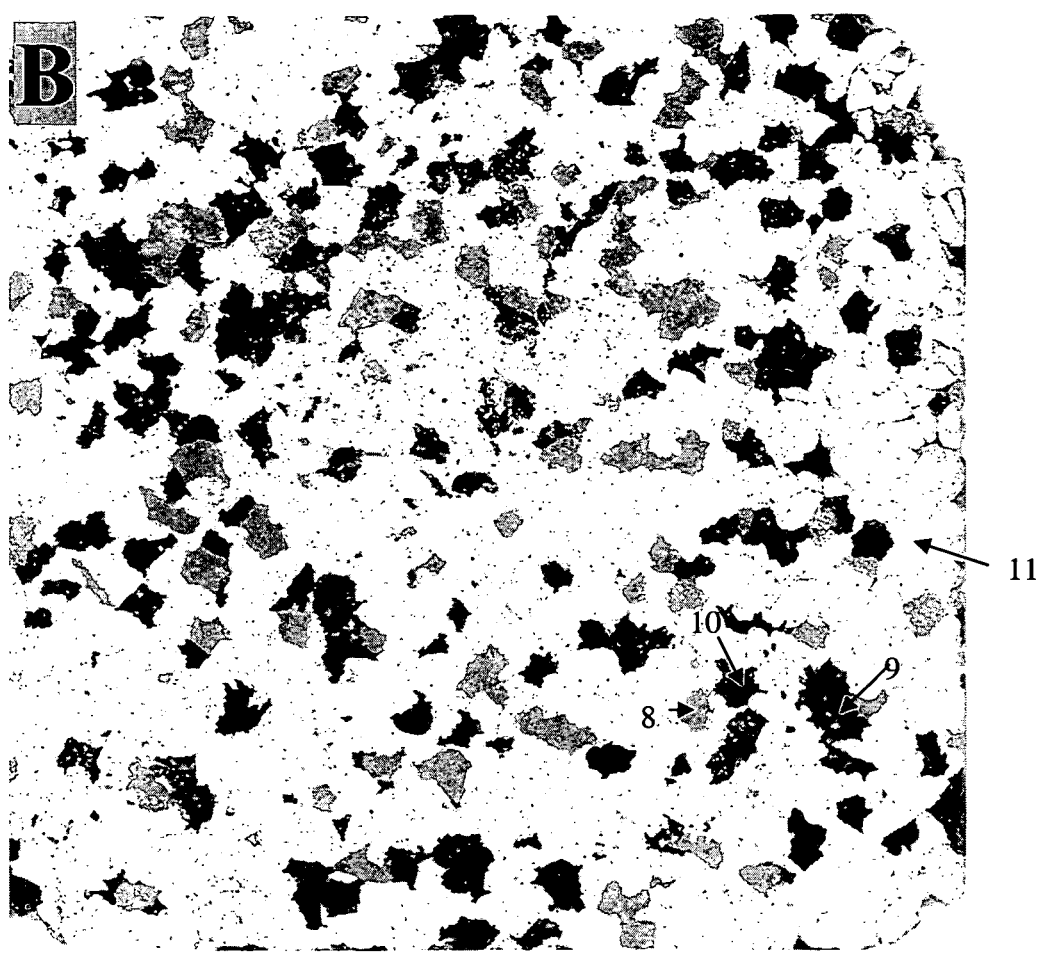
FIG. 6 is a top view of the heterogeneous layer 1 prepared according to Example 3.
Figure 7:
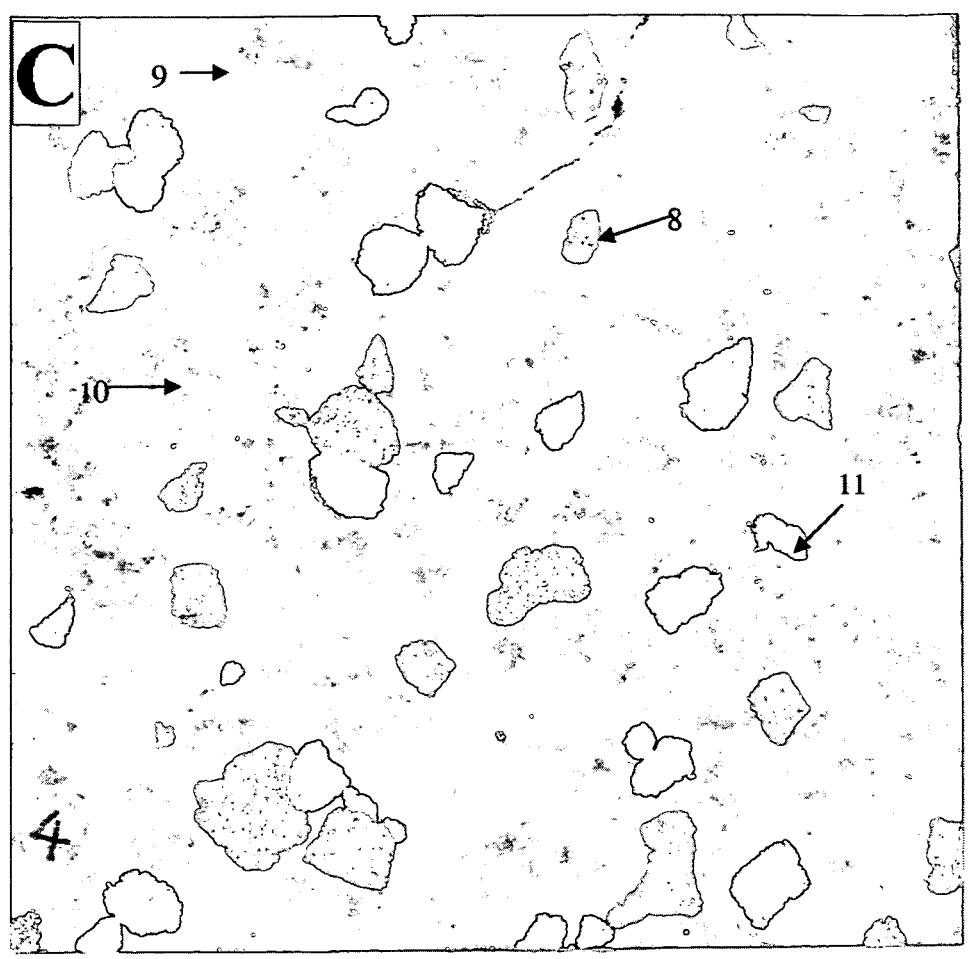
FIG. 7 is a top view of the heterogeneous layer 1 prepared according to Example 4.

FIGS. 5 to 7 show three examples of VCT type tile containing different filler content and colors (FIGS. 5 to 7 correspond respectively to Examples 2 to 4). The Examples also show that even darker colored recycle materials (such as fly ash) can be used in lighter colors at appropriate lower content.

A process for formulating the heterogeneous layer 1 to meet a target wt % recycle or renewable content involves three steps. The first step involves in any order: (a) selecting the target wt % recycle or renewable content for the final product; (b) selecting the number and color of different chips/particle compositions to blend to make the heterogeneous layer; (c) selecting the weight fraction of each of the different chip/particle compositions in the blend; and (d) optionally, determining the maximum concentration of recycle or renewable content for each of the selected different chips/particle compositions which will not adversely affect the color or properties of the chips/particles.

The second step involves: (a) assuming or calculating the recycle or renewable content for each of the different chip/particle compositions; (b) calculating the wt % recycle or renewable content for the blend, based on the recycle or renewable content for each chip/particle composition and the weight fraction of each chip/particle composition in the blend; and (c) comparing the calculated wt % recycle or renewable content for the blend with the target wt % recycle or renewable content.

An optional third step involves: (a) calculating a plurality of wt % recycle or renewable contents for the blend and (b) selecting a blend to use based upon factors including the volume of recycle material available, the affect of the wt % recycle or renewable content on color and properties, and the ease of incorporating chip/particles having the selected wt % recycle or renewable content into the manufacturing process. The wt % recycle or renewable content for the blend depends on the concentration of recycle fillers, recycle binders, and rapidly renewable materials used in each of the chip/particle compositions.

The flooring products of FIGS. 1 to 4 can be manufactured by any known process. One example involves the melt mixing of a composition comprising filler and polymeric binder, and processing aids. The melt mixing can be done in low intensity, "dough type" mixers used in traditional VCT processes; or higher intensity, extruder type mixers, such as Farrell type mixer. The melt-mixed composition may be passed through the nip of a calendar and sheeted off. The sheet may then be cooled, ground and sieved to form chips or particles. The resultant chips or particles may be laid-up and consolidated using well known techniques.

Although the following examples describe one method for making VCT, the present invention is not limited to any one particular manufacturing process or product structure. Although the chips produced in Example 1 are prepared with a traditional VCT type tile binder, the binder may comprise high molecular weight polyester resin, or a blend of PVC homo-polymer resin and high molecular weight polyester resin.

Depending upon the binder resin and the particular recycle filler utilized, other materials such as processing aids, tackifiers, lubricants, stabilizers, plasticizers, pigments, anti-fungal agents, etc., may be required to process the composition into flooring products.

EXAMPLE 1

A traditional VCT formulation containing a blend of PVC homo and copolymer resin (18% binder), calcium carbonate filler, plasticizer, stabilizer, pigment, and processing aid were mixed, heated and melt-mixed, fed into a calender and sheeted out at a thickness of 125 mils. The resultant first sheet was cooled, ground and sieved to produce traditional chips.

A second formulation was mixed in which a portion of the limestone filler was replaced with Ceramic powder at a level to be 10.84% of the final composition. The ceramic powder, designated silica grog CM 80/0 mesh, was obtained from Maryland Refractories Company, Irondale, Ohio. The formulation was similarly formed into a 125 mil thick sheet, cooled, ground and sieved to produce chips 7 containing 10.84% recycle ceramic powder.

A third formulation was mixed in which a portion of the limestone filler was replaced by fly ash recycle filler corresponding to 10% of final composition. The recycle fly ash, designated PV20A, was obtained from Boral Materials Technologies, San Antonio Tex. The formulation was similarly formed into a 125 mil thick sheet, cooled, ground and sieved to produce chips 8 containing 10% recycle fly ash.

A fourth formulation was mixed in which a portion of the limestone filler was replaced by fly ash filler corresponding to 48.89% of the final composition. The formulation was similarly formed into a 125 mil thick sheet, cooled, ground and sieved to produce chips 9 containing 48.89% recycle fly ash.

A fifth formulation was mixed in which a large portion of the limestone filler was replaced by fly ash corresponding to 80.52% of the final composition. The formulation was similarly formed into a 125 mil thick sheet, cooled, ground and sieved to produce chips 10 containing 80.52% recycle fly ash.

A sixth formulation was mixed in which a portion of the limestone was replaced by urea formaldehyde powder corresponding to 10.26% of the final composition. The urea formaldehyde powder, designated UF-40, was obtained from Composition Materials Co., Milford, Conn. The formulation was similarly formed into a 125 mil thick sheet, cooled, ground and sieved to produce chips 11 containing 10.26% recycle urea formaldehyde powder.

The specifics of the formulations are listed in Table 6.

TABLE 6

| Ingredient | PVC Control Amt (g) | Chip 7 Amt (g) | Chip 8 Amt (g) | Chip 9 Amt (g) | Chip 10 Amt (g) | Chip 11 Amt (g) |
|---|---|---|---|---|---|---|
| PVC Homopolymer | 82.99 | 82.99 | 65.50 | 65.50 | 65.50 | 72.69 |
| PVC/Acetate Copolymer | 34.33 | 34.33 | 35.00 | 35.00 | 35.00 | 44.63 |
| Phthlate Plasticizer | 41.96 | 41.96 | 47.50 | 47.50 | 47.50 | 41.96 |
| Plasticizer | 12.59 | 12.59 | 14.25 | 14.25 | 14.25 | 12.59 |
| Stabilizer | 2.11 | 2.11 | 2.00 | 2.00 | 2.00 | 2.11 |
| Filler (Limestone) | 832.61 | 707.70 | 732.60 | 332.60 | 0.00 | 663.60 |
| Pigment (TiO2) | 6.00 | 6.00 | 6.00 | 6.00 | 6.00 | 6.00 |
| ESO | | | 11.40 | 34.20 | 40.00 | |
| Urea formaldehyde | | | | | | 95.00 |
| Ceramic powder | | 106.4 | | | | |
| Fly Ash | | | 100 | 500 | 810.00 | |
| Total | 1000.00 | 981.49 | 1000.00 | 1022.80 | 1006.00 | 925.99 |
| wt %, UF | | | | | | 10.26 |
| wt %, Ceramic | | 10.84 | | | | |
| wt %, Fly Ash | | | 10.00 | 48.89 | 80.52 | |

EXAMPLE 2

The following blend of chips from Example 1 was prepared:
81% chips 7 containing 10.84% ceramic powder
9% chips 8 containing 10% fly ash
7% chips 9 containing 48.89% fly ash
3% chips 10 containing 80.52% fly ash.
This blend of chips was placed within a metal frame in a heated, flat bed press and pressed 2 minutes at 325° F. to provide the VCT product of FIG. 5. The final product had a total recycle content of approximately 15%.

EXAMPLE 3

The following blend of chips from Example 1 was prepared:
81% chips 11 containing 10.26% urea formaldehyde powder
9% chips 8 containing 10% fly ash
7% chips 9 containing 48.89% fly ash
3% chips 10 containing 80.52% fly ash.
This blend of chips was placed within a metal frame in a heated, flat bed press and pressed 2 minutes at 325° F. to provide the VCT product of FIG. 6. The final product had a total recycle content of approximately 14.5%.

EXAMPLE 4

The following blend of chips from Example 1 was prepared:
6.5% chips 11 containing 10.26% urea formaldehyde powder
9.5% chips 8 containing 10% fly ash
3% chips 9 containing 48.89% fly ash
81% chips 10 containing 80.52% fly ash.
This blend of chips was placed within a metal frame in a heated, flat bed press and pressed 2 minutes at 325° F. to provide the VCT product of FIG. 7. The final product had a total recycle content of approximately 68.3%.

EXAMPLE 5

Standard VCT chips were made with 10% dark fly ash filler and the addition of different levels of white TiO2 pigment. Table 7 shows that a white chip containing 10% recycle fly ash filler can be made close to the control.

TABLE 7

Colorimeter Readings of Fly Ash/TiO$_2$ samples

| Prototypes | L | a | b | Db | delta E |
|---|---|---|---|---|---|
| VCT control | 88.38 | −0.15 | 1.99 | | |
| 10.32% fly ash, 0.6% TiO$_2$ | 73.16 | 1.14 | 9.94 | 7.95 | 17.22 |
| 10.32% fly ash, 5% TiO$_2$ | 83.02 | 0.44 | 4.56 | 2.57 | 5.98 |
| 10.32% fly ash, 10% TiO$_2$ | 86.33 | 0.17 | 2.28 | 0.29 | 2.09 |

EXAMPLE 6

Procedure for Preparation of High Molecular Weight Polyester Resin From Diacids and Diols 1A: This describes the general procedure utilized to make thermoplastic, high molecular weight polyesters from diacids and diols. A desired polyester formulation was developed based upon mole equivalent weight of the diacid and diol functional groups. An excess of diol of the most volatile diol component of the formulation was employed in the formulation. In one embodiment, 1,3-propanediol was the excess diol of choice. The diacid and diol ingredients were added into a stainless steel vessel of a RC1 automated reactor (Mettler-Toledo Inc, 1900 Polaris Parkway, Columbus, Ohio), stirred and heated under a continuous flow of pure, dry nitrogen. Typically, the ingredients were heated to 200° C. for 2 hours and temperature increased to 230° C. for an additional 4 to 6 hours until essentially all acid end groups were reacted and theoretical amount of water removed. Subsequently, the nitrogen was stopped and a high vacuum was applied. The mixture was heat and stirred under high vacuum for an additional 4 or more hours at 230° C. to 300° C. In some cases the temperature of the transesterification step was increased to 250° C. or higher. Depending upon the experiment, a vacuum in the range of 5 mm of mercury was utilized. Subsequently, the polymer was allowed to cool to 150° C. to 200° C. and physically removed from the reactor under a flow of nitrogen and allowed to cool to room temperature.

It is understood that removal of the volatile diol component during transesterification leads to high molecular weight. High molecular weight may be obtained faster if higher vacuum is utilized (below 1 mm of mercury). It is also known that as the melt viscosity increases due to increased molecular weight, the removal of diol becomes more difficult. The increase in molecular weight can become diffusion dependent because of the high viscosity of the molten polyester. This means that the released volatile diol from the transesterification reaction reacts back into the polymer before it can diffuse out of the melt, and be removed. Renewing the surface of the melt can facilitate the loss of diol and increase molecular weight. The polyesters obtained by this procedure generally have terminal hydroxyl end groups.

Although, diacid components are described above, it is understood that their simple diesters such as from methanol or ethanol can be used to prepare the thermoplastic polyester resin via known transesterification techniques. The polyesters from this procedure generally have ester terminated end groups.

1B: The same general procedure as in 1A is employed. A desired polyester formulation was developed based upon mole equivalent weight of the diacid and diol functional groups. An excess of about 0.01 to 0.5 mole excess of diacid was typically employed in the formulation. The ingredients were mixed and heated as in 1A above, except that the temperature was generally held below 200° C. to keep acid/anhydride from being removed until all hydroxyl groups were reacted. Subsequently, a high vacuum was applied as in 1A and the mixture heated to between 230° C. and 280° C. and stirred as in Procedure 1A. The resultant high molecular weight polyester was removed from the reactor and cooled as in 1A.

The mechanism of achieving high molecular weight is not clear. In some formulations containing phthalic anhydride, the phthalic anhydride was identified as being removed from the mixture. Using a nitrogen sparge below the surface of the molten polyester during the vacuum step also helped produce high molecular weight polyesters. The polyesters obtained by this procedure generally have terminal acid end groups.

EXAMPLE 7

Procedure for Preparation of High Molecular Weight Polyester Resin Comprising Renewable Polyester and Recycle Polyester Resin Components.

The following formulation was processed as per Example 6 to prepare the aliphatic polyester EX-19 comprising 100% renewable components and a Biobased Content of 100%.

|  | EX-19 |
| --- | --- |
| 1,4-Butanediol | 400.5 |
| Sebacic acid | 600 |
| T-20 Catalyst: Dibutyltin bis-lauryl mercaptide | 0.4 |

The aliphatic polyester EX-19 was mixed with clear PET bottle recycle resin obtained from Nicos Polymers & Grinding of Nazareth, Pa., and catalyst added as listed below.

|  | EX-20 Amt (g) |
| --- | --- |
| PET recycle bottle | 100 |
| EX-19 | 100 |
| T-20 Catalyst | 0.13 |

The mixture was heated and stirred under nitrogen at 265° C. for a period of about 3 hours, and a high vacuum applied as in Example 6 for an additional 3 hours at 265° C. Subsequently, the resultant polyester having 50% renewable content and 50% recycle content was shown to have a molecular weight Mn of 17,200 with a Tg of −9° C. and a Tm of 114° C. Molecular weight Mn of the starting PET recycle bottle resin was determined by GPC techniques described above and found to be 14,000. A sample of PET film obtained from Nicos Polymers & Grinding was also analyzed by GPC and molecular weight Mn determined to be 17,300.

EXAMPLE 8

Examples of Polyesters Made by Transesterification Between High Molecular Weight Aliphatic, Renewable Polyesters and Recycle Polyester Resin.

High molecular weight polyesters comprising the compositions of Table 8A were made according to Example 6.

TABLE 8A

|  | Azelaic Acid Amt (g) | 1,4-Butanediol Amt (g) | Sebacic Acid Amt (g) | T-20 Amt (g) | Total Amt (g) |
| --- | --- | --- | --- | --- | --- |
| EX-21 | 511 | 489 |  | 0.4 | 1000 |
| EX-22 | 582 | 417.6 |  | 0.4 | 1000 |
| EX-23 |  | 400.5 | 600 | 0.4 | 1001 |
| EX-24 |  | 471.2 | 528 | 0.4 | 1000 |
| EX-19 | 674 | 325.74 |  | 0.5 | 1000 |
| EX-25 |  | 354 | 529 | 0.4 | 883 |

The polyesters of Table 8A, were each mixed with recycle PET bottle resin obtained from Nicos Polymers & Grinding of Nazareth, Pa., and 0.1% T-20 catalyst added and transesterification conducted as per Example 7. In some examples, transesterification was also carried out on PBT resin Celanex 1600A obtained from Ticona (formerly Hoechst Celanese Corp.), Summit, N.J. Table 8B shows some of the resultant polyester co-reaction products and their Tm. It is obvious that these transesterification reactions may be carried out on virgin PET or PBT type resin.

TABLE 8B

| PE Transesterification Rxn # | Polyester ID used in Transesterification Rxn | Recycled Bottle PET | PBT Celanex | PB Azelate | Ecoflex FBX7011 | PB Sebacate | melt range (deg C.) trans product | Mid-point mp (deg C.) |
| --- | --- | --- | --- | --- | --- | --- | --- | --- |
| Nicos Scrap PET |  |  |  |  |  |  | 255-259 | 256 |
| EX-26 | EX-21 | 70 | 30 |  |  |  | 138-154 | 145 |

TABLE 8B-continued

| PE Transesterification Rxn # | Polyester ID used in Transesterification Rxn | Recycled Bottle PET | PBT Celanex | PB Azelate | Ecoflex FBX7011 | PB Sebacate | melt range (deg C.) trans product | Mid-point mp (deg C.) |
|---|---|---|---|---|---|---|---|---|
| EX-27 | EX-22 | 50 | | 50 | | | 84.5-104.8 | 94.9 |
| EX-28 | EX-22 | 70 | | 30 | | | 140-159 | 146 |
| EX-29 | EX-23 | 50 | | | | 50 | 99-126 | 102.9 |
| EX-30 | EX-23 | 70 | | | | 30 | 155-170 | 160 |
| EX-31 | EX-24 | 50 | | | | 50 | 101-125 | 109 |
| EX-32 | EX-24 | 70 | | | | 30 | 149-156 | 151 |
| EX-33 | EX-19 | 50 | | 50 | | | 100-111 | 105 |
| EX-34 | EX-19 | 70 | | 30 | | | 133-141 | 136 |
| EX-35 | EX-25 | 50 | | | | 50 | 92-106 | 97 |
| EX-36 | EX-25 | 70 | | | | 30 | 110-170 | 140 |
| EX-37 | EX-21 | | 75 | 75 | | | 135-141 | 137 |
| EX-36 | EX-25 | | 75 | | | 75 | 145-166 | 156 |
| EX-39 | EX-23 | 180 | | | | 120 | 79-153 | 87 |
| EX-40 | EX-19 | 180 | | 120 | | | 73-108 | 79 |
| EX-41 | Ecoflex FXB7011 | 180 | | | 120 | | 122-158 | 137 |

The melting points listed in Table 8B were determined using an "Optimelt" automated unit.

What is claimed is:

1. A flooring product comprising a heterogeneous layer having at least a first region and a second region comprising consolidated chips or particles, the consolidated chips or particles comprising a polymer binder and a filler, the filler including renewable content portion or recycle content portion that imparts a color to the consolidated chips or particles, wherein a resulting first concentration of the renewable content or the recycle content of the consolidated chips or particles of the first region is different from a resulting second concentration of the renewable content or the recycle content of the consolidated chips or particles of the second region such that the color of the consolidated chips or particles of the first region is different from the second region, and
    wherein the heterogeneous layer includes at least a first percentage by weight of the first region and a second percentage by weight of the second region, resulting in at least a first region renewable content or recycle content concentration and a second region renewable content or recycle content concentration such that the summation of at least the first region renewable content or recycle content concentration and the second region renewable content or recycle content concentration results in a total renewable content or recycle content of approximately 15 percent or greater by weight and the first percentage differs from the second percentage;
    wherein at least one of the first region and the second region comprises a Biobased content of at least 5% by weight.

2. The flooring product of claim 1, wherein the thickness of the heterogeneous layer is greater than the dimensions of the first region and the second region.

3. The flooring product of claim 1, wherein the flooring product consists essentially of the heterogeneous layer.

4. The flooring product of claim 1, wherein the total renewable content or recycle content of the heterogeneous layer qualifies for at least one point under the LEED System.

5. The flooring product of claim 1, wherein the weight percent of the renewable content or the recycle content of the first region is different than the weight percent of the renewable content or the recycle content of the second region.

6. The flooring product of claim 1, further comprising a third region having zero renewable content or recycle content.

7. The flooring product of claim 1, wherein the first region is darker in color than the color of the second region and has a higher renewable content or recycle content than the renewable content or the recycle content of the second region.

8. The flooring product of claim 1, wherein the polymer binder comprises a polyester resin, the polyester resin is a high molecular weight polyester resin, and the polyester resin comprises a renewable component.

9. The flooring product of claim 1, wherein the first region and the second region extends from a top surface of the heterogeneous layer to a bottom surface of the heterogeneous layer.

10. The flooring product of claim 1, wherein the recycle content portion of the filler includes fly ash.

11. The flooring product of claim 1, wherein the high molecular weight polyester comprises at least one of polyethylene terephthalate, polybutylene terephthalate, and polypropylene terephthalate.

12. The flooring product of claim 1, wherein the consolidated chips are throughout the flooring product.

13. The method of imparting the color to the consolidated chips of the flooring product of claim 1.

14. The flooring product of claim 1, wherein the filler of at least one of the first region and the second region further comprises a non-renewable or non-recycle filler.

15. The flooring product of claim 14, wherein the non-renewable or non-recycle filler is titanium dioxide.

16. The flooring product of claim 1, wherein the binder comprises a renewable component polyester portion and a recycle polyester resin portion, wherein the renewable component polyester portion is approximately 50 percent by weight and the recycle polyester resin portion is approximately 50 percent by weight, and wherein the renewable component polyester portion comprises a high molecular weight polyester with a molecular weight of greater than 5000.

17. The flooring product of claim 16, wherein the recycle polyester resin portion comprises a recycle PET or PBT type resin.

18. The flooring product of claim 1, wherein the polymer binder comprises an aliphatic acid.

19. The flooring product of claim 18, wherein the aliphatic acid comprises at least one of sebacic acid, succinic acid, azelic acid, and citric acid.

20. The flooring product of claim 1, wherein the polymer binder comprises an aliphatic diol.

21. The flooring product of claim 20, wherein the aliphatic diol comprises at least one of 1,3 propane diol, 1,4 butanediol, glycerine, neopentyl glycol, epoxidized soybean oil, and epoxidized linseed oil.

22. The flooring product of claim 1, wherein the polymer binder comprises an aromatic diacid.

23. The flooring product of claim 22, wherein the aromatic diacid comprises at least one of phthalic acid anhydride, isophthalic acid, terephthalic acid, and trimellitic anhydride.

24. The flooring product of claim 1, wherein the polymer binder comprises an acid functionalized polymer.

25. The flooring product of claim 24, wherein the acid functionalized polymer comprises at least one of Surlyn, ethylene acrylic acid, ethylene maleic acid, methacrylic acrylic acid, and maleic acid.

* * * * *